United States Patent
de Kock

(10) Patent No.: US 8,950,559 B2
(45) Date of Patent: Feb. 10, 2015

(54) ADJUSTABLE SHOCK ABSORBER

(75) Inventor: Paul de Kock, Numansdorp (NL)

(73) Assignee: Koni B.V. (NL)

( * ) Notice: Subject to any disclaimer, the term of this patent is extended or adjusted under 35 U.S.C. 154(b) by 122 days.

(21) Appl. No.: 13/499,241

(22) PCT Filed: Sep. 27, 2010

(86) PCT No.: PCT/NL2010/050625
§ 371 (c)(1),
(2), (4) Date: Mar. 29, 2012

(87) PCT Pub. No.: WO2011/040808
PCT Pub. Date: Apr. 7, 2011

(65) Prior Publication Data
US 2012/0181126 A1 Jul. 19, 2012

(30) Foreign Application Priority Data
Sep. 29, 2009 (NL) ...................................... 2003571

(51) Int. Cl.
*F16F 9/34* (2006.01)
*F16F 9/348* (2006.01)
*F16F 9/46* (2006.01)
*F16F 9/512* (2006.01)

(52) U.S. Cl.
CPC ............... *F16F 9/3488* (2013.01); *F16F 9/465* (2013.01); *F16F 9/5126* (2013.01)
USPC ................ 188/282.8; 188/282.5; 188/322.15; 188/322.22

(58) Field of Classification Search
USPC ................ 188/282.8, 280, 281, 232.3, 282.4, 188/282.5, 282.6, 316, 317, 320, 322.15, 188/322.22; 267/64.11, 64.15
See application file for complete search history.

(56) References Cited

U.S. PATENT DOCUMENTS

| 5,207,300 | A | * | 5/1993 | Engel et al. | 188/266.2 |
| 5,248,014 | A | * | 9/1993 | Ashiba | 188/282.8 |
| 5,566,796 | A | * | 10/1996 | De Kock | 188/282.1 |
| 7,100,750 | B2 | * | 9/2006 | Drees | 188/322.15 |
| 2004/0251099 | A1 | | 12/2004 | Papp et al. | |
| 2008/0149438 | A1 | | 6/2008 | Chikamatsu | |

FOREIGN PATENT DOCUMENTS

| CN | 1113298 | 12/1995 |
| DE | 1455823 | 5/1969 |
| EP | 0492107 | 7/1992 |
| EP | 0668175 | 8/1995 |
| WO | 9419619 | 9/1994 |

OTHER PUBLICATIONS

International Searching Authority, International Search Report and Written Opinion for PCT/NL2010/050625, Nov. 4, 2010, 8 pages.

* cited by examiner

*Primary Examiner* — Pamela Rodriguez
(74) *Attorney, Agent, or Firm* — Meyer IP Law Group

(57) ABSTRACT

Shock absorber comprising a piston inside which a sleeve is present which can be operated separately from the piston. This sleeve is provided with through-flow conduits which can cooperate with apertures, which are fitted at a vertical distance, of a part of the piston in order to provide an auxiliary flow when the piston is displaced in the cylinder. Such auxiliary flow enters into a chamber which is delimited by one or more spring plates which act on a sleeve which loads the main valve against opening when it is pressed down by the spring plate. By filling the chamber with fluid, the load applied on the sleeve by the spring plate is reduced and the load on the main valve decreases, as a result of which the latter opens more readily.

20 Claims, 5 Drawing Sheets

ADJUSTABLE SHOCK ABSORBER

TECHNICAL FIELD

The present invention relates to a shock absorber according to the preamble of claim 1.

BACKGROUND

More particularly, the present invention relates to an adjustable shock absorber, that is to say a shock absorber whose damping characteristic can be influenced while driving. From the prior art, designs are known in which the pressure on the main valve is influenced by sending an auxiliary flow to the piston. The known designs have the drawback that they need a particularly high adjustment speed which requires complicated electronics. In addition, sensors have to be fitted both to the wheel and to the body of the vehicle. Systems of this type which require large numbers of sensors are highly vulnerable and demand a great deal of expertise during fitting and/or maintenance.

SUMMARY

DE 1455823 discloses a shock absorber whose damping characteristic can be changed during use. By displacing fluid in an auxiliary conduit, damping becomes increasingly stiff with progressive movement. By pumping increasingly more fluid into a dedicated space as strokes are being carried out repeatedly, the shock absorber becomes increasingly stiff. The reaction of the characteristic of the shock absorber is relatively slow and is influenced for a number of strokes in the direction in which stiffness increases. The reduction takes place gradually over a number of strokes.

It is an object of the present invention to provide a relatively simple shock absorber by means of which the damping characteristics can be influenced particularly rapidly.

This object is achieved with a shock absorber having the features of claim 1.

CLAIM OF PRIORITY

This application is a 371 of International Patent Application No. PCT/NL2010/050625, entitled "ADJUSTABLE SHOCK ABSORBER" by de Kock, filed Sep. 27, 2010, which claims priority to NL2003571 filed Sep. 29, 2009, which applications are herein incorporated by reference.

According to the present invention, the pressure on the main valve is applied by a pressure element, such as a sleeve, and said pressure element is pressurized by means of an auxiliary valve which is embodied as a plate spring. In the closed position, said auxiliary valve can provide complete sealing, resulting in an on/off situation. However, it is also possible for a constantly open aperture to be present parallel to said auxiliary valve, a so-called constant, which makes continuously adjustable control possible. The above-described non-return valve is necessary when a parallel aperture is present. This is the case particularly when such a parallel aperture, which connects both sides of the piston, is an aperture which can significantly influence the damping. This is due to the fact that for a rapid reaction, according to an advantageous embodiment of the invention, an aperture of considerable dimensions is desired, so that the built-up pressure can be reduced again quickly. The pressure element and auxiliary valve delimit a part of a chamber into which auxiliary fluid can flow. As more fluid flows into said chamber, the pressure which is exerted on the pressure element by the auxiliary valve will be reduced and thus the pressure on the main valve will decrease. The fluid which flows through the auxiliary conduit and the auxiliary valve is quickly carried away via an aperture so that the above-described accumulation of pressure via a number of strokes known from the prior art does not occur. This results in a particularly rapid adjustment which may lead to a modified characteristic with each stroke and even with each partial stroke of a shock absorber. More particularly, according to a particular embodiment of the invention, the flow in the chamber can be influenced by means of a bush which is present in the piston and can be displaced with respect thereto. This bush provides a bypass conduit. This bypass conduit for auxiliary fluid also extends through two spaced-apart apertures in the piston. By moving the position of the bypass conduit in the bush with respect to the apertures in the piston, it is possible to achieve a greater or smaller choking effect, as a result of which the effect of the reduction of the pressure on the main valve can be influenced. Operation of the bush can be effected in any conceivable way. Thus, it is possible to embody the piston rod to be hollow and thus to provide an actuating rod for the bush. This can be operated by hand, electrically or in any other conceivable way at the top end of the piston rod. However, it is also possible to install wiring in the hollow piston rod which actuates a coil which is fitted near the piston and which then determines the position of the bush. With electrical embodiments, it is possible to rapidly adjust the characteristic for each stroke of the shock absorber or even during the movement of the shock absorber. Such an electrical embodiment can be realized relatively simply and requires few vulnerable parts.

The above-described principle of controlling the preload on the main valve by using an auxiliary valve for loading, the applied force of which is reduced when the fluid flow is present, can be used both in a direction of movement of the piston with respect to the cylinder and in both directions of movement of the piston with respect to the cylinder. In addition, the bush in combination with the delimiting part of the piston in which the apertures are provided can be configured such that when the auxiliary flow is influenced in two directions when the passage for the auxiliary flow in one direction is enlarged, the auxiliary flow in the other direction is, on the contrary, throttled more. If sufficient flow through the auxiliary conduit can be effected affected, it is possible by means of the above-described electrical control mechanism to influence the damping characteristic during the stroke. This variant, if configured as an electrical device, also consists of a particularly simple construction comprising few vulnerable components and exhibiting great operational reliability. By means of the present invention, it is possible to achieve a so-called "sky hook"-characteristic, without using specific sensors such as employed in the prior art to be able to influence the shock-absorbing performance during a damping stroke.

Just like the main flow, the auxiliary flow extends along both sides of the piston and therefore, a non-return valve can be present therein. Such a non-return valve may be a separate valve, but may for example also form part of the main valve.

BRIEF DESCRIPTION OF THE DRAWINGS

The invention will be explained in more detail below with reference to a number of exemplary embodiments, in which.

DETAILED DESCRIPTION

Figure 1:
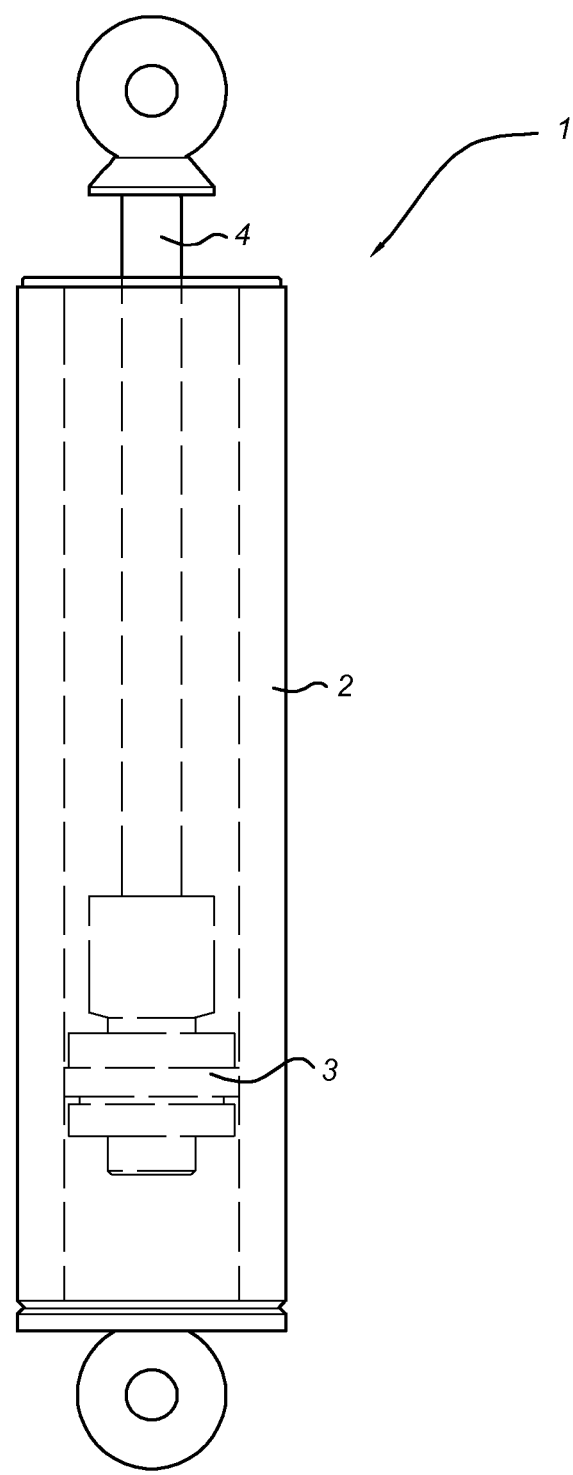
FIG. 1 diagrammatically shows a shock absorber according to the present invention.

FIG. 1 diagrammatically shows a shock absorber which is denoted overall by reference numeral 1. It consists of a cylinder 2 and a reciprocating piston 3 which, via a piston rod 4, is connected to a fastening means which is not shown in detail. Piston 3 and cylinder 2 are attached to the various parts which are to be damped with respect to one another of, for example, a vehicle.

Figure 2:
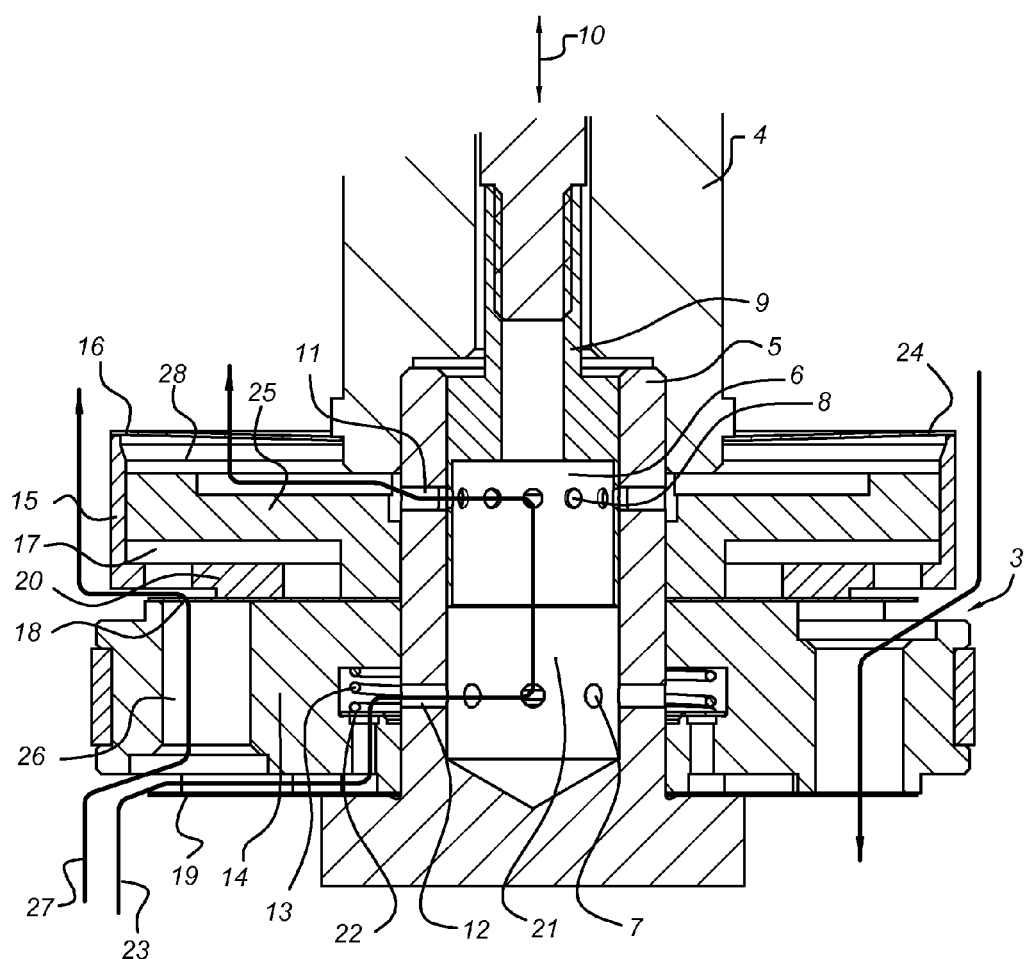
FIG. 2 shows a first exemplary embodiment of the piston illustrated in FIG. 1.

Details of a first embodiment of the piston 3 can be seen in FIG. 2. The piston 3 comprises a core 5 which is fixedly connected to the piston rod 4. This core comprises a cavity 21 in which a bush 6 can be rapidly moved to and fro. This bush 6 is hollow and provided with spaced-apart apertures 7 and 8. Bush 6 can be moved to and fro in the direction of arrow 10 with respect to the piston rod 4 by means of the rod 9 which is connected thereto and which can move to and fro inside the piston rod 4. Displacement can be effected, for example, by means of a piezo element, coil, rotating stepping motor, manually and the like. In the illustrated position, the apertures 7 and 8 are in front of the apertures 11 and 12, respectively. By displacing the bush with respect to the piston, the throughflow passage between apertures 7 and 11, and 8 and 12, respectively, can be enlarged or reduced. A spring 13 loaded valve 22 is present in the flow path for fluid indicated by line 23.

Around core 5, ring parts 14 and 25 are provided which are fixedly connected to core 5. Between the ring parts 14 and 25, a main valve 18 is provided which comprises a spring-mounted plate. It seals a bore 26 against the passage of the flow denoted by reference numeral 27. The resistance of the valve 18 to being opened is partly determined by the pressing of the bottom 20 of a sleeve 15 which is fitted around the ring part 25 so as to be displaceable with respect thereto. As can be seen in FIG. 2, this sleeve 15 is pushed down by a spring plate 16. That is to say that the force which the spring plate 16 exerts on the sleeve 15 and thus on the bottom 20 thereof determines the opening characteristics of the main valve 18. As the spring plate 16 seals completely in this exemplary embodiment, an on/off situation arises when reducing the prestressing force on the sleeve 15.

Between the ring part 25 and the bottom 20 of the sleeve 15, there is a chamber 17 which is at the same pressure as the part of the cylinder 2 situated above the piston 3.

When the piston moves down in the cylinder, the above-described embodiment functions as follows:

The main stream indicated by reference numeral 27 experiences a resistance from the main valve 18 which is determined by the pressure of the ring 20 of the sleeve 15 and thus by the force of spring plate 16. If a prolonged downward movement takes place and the bush 6 is positioned such that flow path 23 is open, pressure will build up in chamber 28. This build-up of pressure is counteracted by the aperture 24. The balance between influent fluid/discharged fluids determines the build-up of pressure in the chamber. When pressure builds up, the downward closing force of spring plate 16 on the sleeve 15 will decrease. As a result thereof, the bottom 20 of sleeve 15 will press on the main valve 18 with less force, thus opening a larger aperture to the main flow 27. By moving the bush 6 upwards, a throttling effect can be achieved between the apertures 7-12 and 8-11 and, if desired, complete sealing can be effected. In this manner, the damping characteristic can be adjusted in a particularly simple way. It is possible to change the damping characteristic in a simple manner by adjusting the sleeve 15 and more particularly the bottom 20.

This is due to the fact that, if the point of contact of the main valve 18 with respect to bottom 20 is moved, the stiffness of the opening part of the main valve 18 will change due to the fact that the free end of the main valve 18 becomes longer or shorter. Thus, the optimum setting for the respective vehicle can be found in a simple and reproducible way.

The above-described effect of influencing the main valve 18 by means of a secondary fluid flow 23 which reduces the prestressing force of said valve 18 can also take place in the opposite direction. This is shown in FIGS. 3A-3C.

Figures 3A, 3B, 3C:
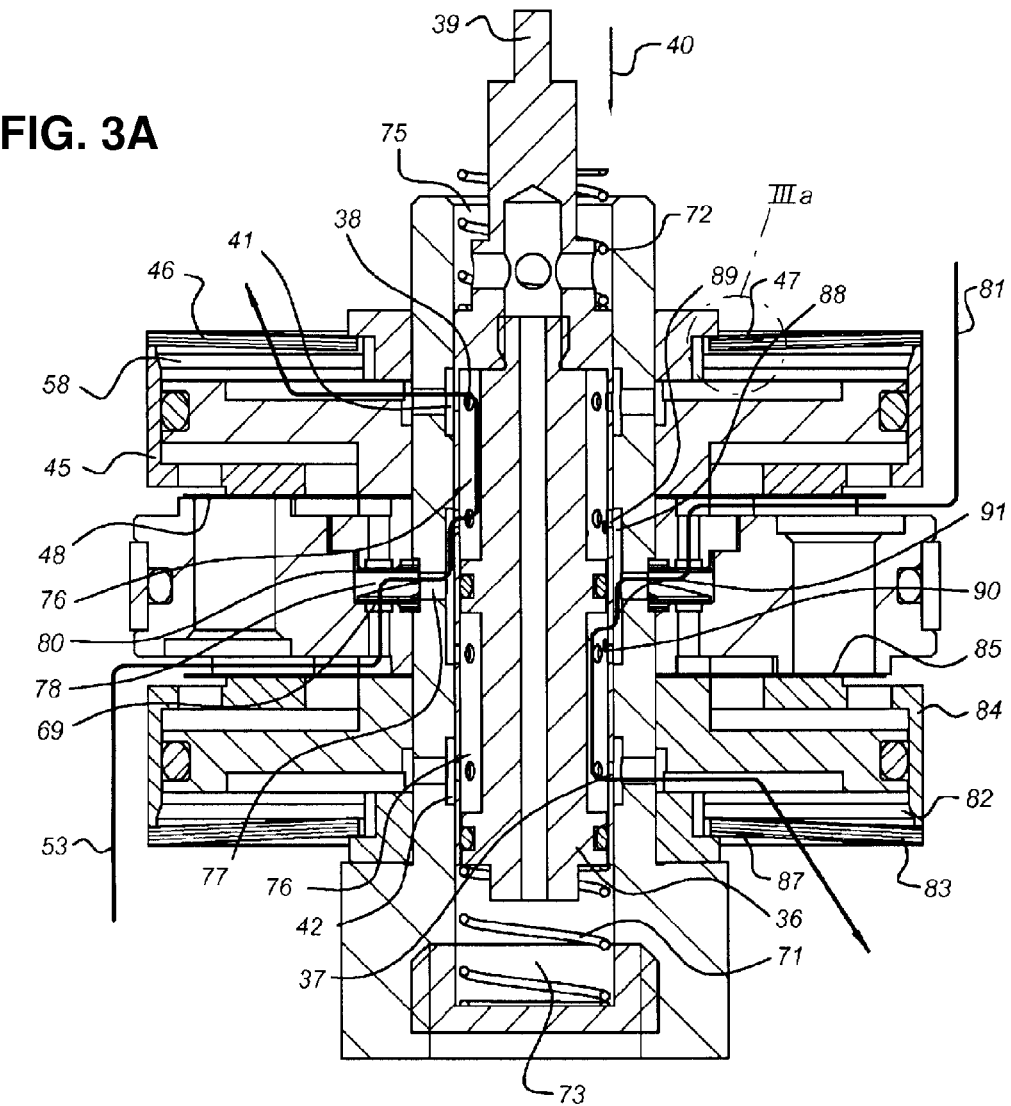
FIGS. 3A-3C show a further example of the piston illustrated in FIG. 1.

The embodiment shown in FIGS. 3A-3C is partly identical to the one shown in the first two figures. Identical parts are provided with the same reference numerals increased by 30. The bush 36 which is connected to the rod 39 which moves inside the hollow piston rod 34 is embodied such that the device illustrated in FIG. 2 operates in two directions. Bush 36 is received between springs 71 and 72. The "upper part" of the piston 33 corresponds substantially to what has been described above. This means that an auxiliary valve 46 embodied as a spring plate is present which, in this example, is composed of several spring plates, as a result of which the stiffness of each shock absorber can also be adapted to the respective vehicle in a simple manner. As was the case in the preceding example, auxiliary valve 46 actuates a sleeve 45 which in turn acts on the main valve 48. Under auxiliary valve 46, a chamber 58 is delimited which can be connected, via apertures 38 and 41, to the displaceable bush (dependent on whether or not these apertures are in line with one another). Via a conduit 76, aperture 38 opens into a central inlet aperture 77 which, situated opposite aperture 78, forms part of the part of the piston which is fixedly connected to the piston rod. When the piston moves downwards, that is to say in the direction of arrow 40, fluid can pass into the chamber 58 via non-return valve 69 via line 53 and thus reduce pressure on sleeve 45, as a result of which the main valve 48 opens more easily. In contrast to the above-described example, the auxiliary valve 46 does not effect complete sealing of the chamber 58. A slot 47 is present which provides an aperture which is constantly open between chamber 58 and the part of the cylinder which is situated above the piston. This slot 47 provides a so-called constant. A corresponding slot 87 is provided on the other side and has the same function.

As is indicated here, the structure from FIGS. 3A-3C operates in two directions. This is due to the fact that conduit 76 extends also in the downward direction and can also be connected to the aperture 77, via non-return valve 80. When the piston is moved upwards, that is to say counter to the direction of arrow 40, fluid can, via this non-return valve 80, enter into conduit 76 along line 81 and subsequently, via apertures 37, 42, into chamber 82 which is delimited by auxiliary valve 83, which forces sleeve 84 upwards in order to close the other main valve 85 which operates in the opposite direction. The characteristic of both main valves 48 and 85 may differ due to the number of plate parts from which they are composed. Further details of the slot can be seen in FIGS. 3B and 3C.

Due to the presence of a sealed chamber 73 under the bush 36 and the presence of a conduit 74 which connects this chamber to the part 75 which is situated above the bush, a load will be applied to rod 39, depending on the direction of movement of the parts to which the shock absorber 31 is connected. When the actuating rod 39 is connected to a sensor (not shown), this information can be used in a simple manner to adjust the shock absorber. By means of the structure illustrated in FIGS. 3A-3C, it is possible to change the shock absorber characteristic considerably by displacing the bush 36. Thus, it is possible to produce an outwardly hard damping and an inwardly soft damping or the reverse. If the rod 39 is connected to an electrical control mechanism which reacts, for example, to an acceleration sensor mounted in the vehicle, it is possible to achieve damping tailored to the circumstances without having to fear excess due to phase-shift. In addition, due to the embodiment of the bush 36 and more particularly the positioning of the various abovementioned apertures, hard inward damping and soft outward damping or soft inward damping and hard outward damping are always present in combination.

Due to the presence of the slots 47 and 87 acting as constants, no on/off situation will occur when a fluid flow occurs in, for example, chamber 58, as was the case with the above-described example. If the fluid flow is relatively small, the constant 47 will be able to discharge the fluid without a significant increase in pressure occurring. If the fluid flow is relatively large, auxiliary valve 46 will be lifted off its seat and the above-described effect of a reduction in the pressure on the sleeve 45 occurs. By adjusting the prestress of auxiliary valve 46 and the size of the constant 47, the damping characteristic can be determined.

By means of the present invention, it is possible to adjust bush 36 at a relatively low frequency, for example at a frequency of 1-2 Hz.

In both abovementioned exemplary embodiments, the pressure on the main valve is reduced when filling the chamber which acts on the auxiliary valve as a result of the fact that the load applied to the main valve by the auxiliary valve is reduced as a result of the fluid pressure applied to the auxiliary valve. By adjusting the bush or slide 6, 36 and more particularly the apertures thereof to the chamber of the auxiliary valve, the damping characteristic can be influenced. With the embodiment illustrated in FIG. 3, the inward and outward damping are then set simultaneously, in which case an asymmetrical control characteristic can be achieved by means of the position of the sealing body 87 and the slot 88 in combination with the apertures 89, 90 and the body 91.

Figure 4:
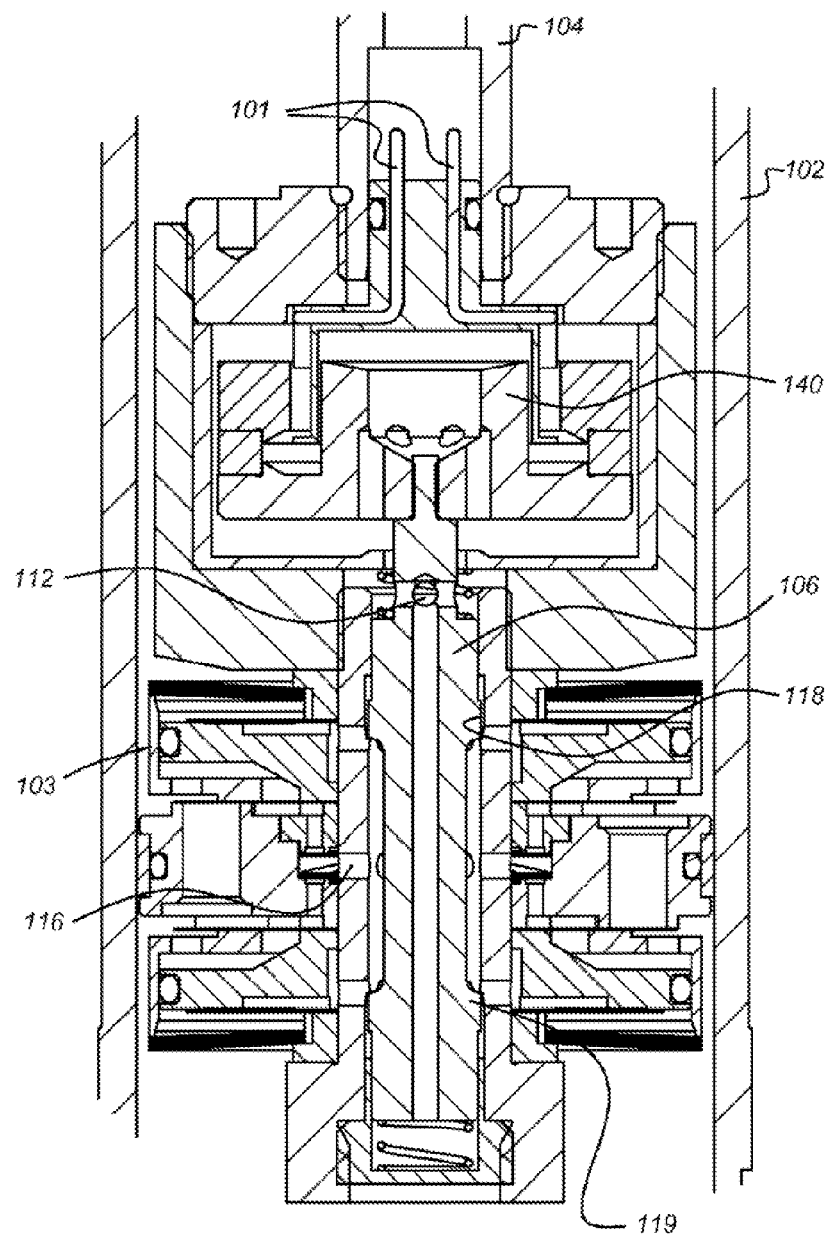
FIG. 4 shows a further variant of the bush used in the piston.

A further variant of the invention is illustrated in FIG. 4. This shows a cylinder part 102 in which a piston which is denoted overall by reference numeral 103 moves up and down. The piston rod 104 is again hollow and wiring 101 is fitted on the inside for operating a coil 140 by means of which a displaceable bush 106 can be actuated. The construction of the main valves and auxiliary valves in this case substantially corresponds to that which has been shown in FIG. 3. In contrast to the embodiment from FIG. 3, the bush is not provided with the central sealing body 87. Fluid which enters conduit 116 can flow unhindered to one of the chambers below the auxiliary valves. A compensation conduit 112 is present, as a result of which the pressure above and below the bush 106 is equal, so that the operation thereof is not effected by differences in pressure. With this embodiment, when the respective opposite aperture of the piston part is opened further, the other aperture will close, by contrast, due to the positioning of the sealing bodies 118 and 119. As a result thereof, the controlled variable on the non-controlled side is inverted, as a result of which a direction sensor, as is used with prior art shock absorbers, is obsolete with this concept. The operation of the main valves, auxiliary valves and non-return valves is substantially as has been described with reference to FIGS. 3 and 2.

Figure 5:
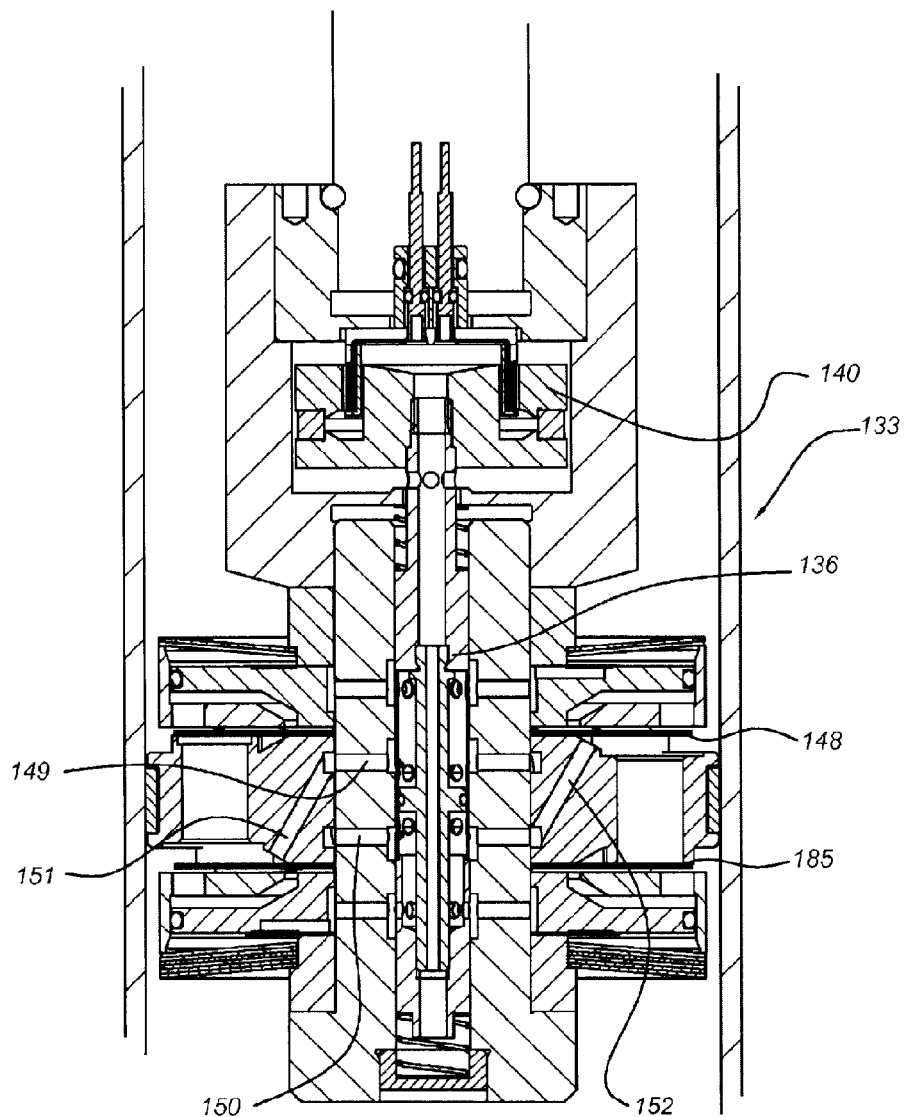
FIG. 5 shows a further embodiment of the non-return valve used for the auxiliary flow.

FIG. 5 illustrates a further variant of the invention. In this case, only the piston 133 is illustrated, provided with a bush 136 actuated by a coil 140. The apertures or conduits 149, 150 situated opposite the bush are, via auxiliary conduits 152, 151, connected to the main valves 148, 185 which also function as non-return valve. This application is particularly suitable for heavy shock absorbers.

Upon reading the above, those skilled in the art will immediately be able to think of variants which are covered by the scope of the attached claims and which are obvious after having read the above.

The invention claimed is:

1. A shock absorber (1, 31) comprising:
    a cylinder (2, 32, 102) provided with a fastener, a piston (3, 33, 103, 133) which is displaceable therein and which is connected to a piston rod (4) provided with a fastener,
    in which the piston, for movement in the cylinder, includes a main passage for a main flow and an auxiliary passage for an auxiliary flow between opposite sides of the piston,
    in which a pressure-loaded main valve (18, 48, 85) is fitted in the main passage,
    in which a non-return valve (22) is fitted in the auxiliary passage, and an auxiliary plate-shaped valve (16, 46) delimits a chamber (28, 58) into which the auxiliary passage opens,
    in which a displaceable pressure element (15, 45) is arranged between the plate-shaped valve and the main valve,
    in which pressure on the main valve is applied by the pressure element (15, 45), and
    in which the plate-shaped valve (16, 46) acts on the pressure element,
    wherein the plate-shaped valve is embodied such that the maximum pressure force is applied by the pressure element on the main valve when the auxiliary flow through the auxiliary passage is absent and that the auxiliary flow through the auxiliary passage into the chamber acts in the chamber under the plate-shaped valve in order to reduce the force transmitted thereby onto the pressure element.

2. The shock absorber according to claim 1, wherein an adjustable throttling member (6, 36, 106, 136) is provided in the auxiliary passage for the auxiliary flow.

3. The shock absorber according to claim 2, wherein the throttling member comprises a displaceable slide accommodated in a sleeve, wherein the sleeve and the slide are provided with apertures which can be arranged opposite one another and through which extend conduits for the auxiliary flow.

4. The shock absorber according to claim 3, wherein the sleeve and slide are provided with two spaced-apart series of apertures.

5. The shock absorber according to claim 3, wherein the movement is an inward and outward movement of the piston in the cylinder, and wherein the sleeve comprises an inlet (116) which is common to both the inward and outward stroke and wherein the part of the sleeve corresponding to the inlet opens out on both sides of the sealing of the piston cylinder.

6. The shock absorber according to claim 2, wherein the piston rod is hollow and comprises an operating part for the throttling member.

7. The shock absorber according to claim 2, wherein the movement is an inward and outward movement of the piston in the cylinder, and wherein the adjustable throttling member (6, 36, 106, 136) is embodied such that due to its operation the inward stroke is damped more and the outward stroke is damped less.

8. The shock absorber according to claim 2, wherein the movement is an inward and outward movement of the piston in the cylinder, and wherein the adjustable throttling member (6, 36, 106, 136) is embodied such that due to its operation, the inward stroke is damped less and the outward stroke is damped more.

9. The shock absorber according to claim 1, wherein the movement is the inward movement of the piston in the cylinder.

10. The shock absorber according to claim 1, wherein the movement is an inward and outward movement of the piston in the cylinder.

11. The shock absorber according to claim 1, wherein the non-return valve in the auxiliary passage comprises an auxiliary valve.

12. The shock absorber according to claim 1, wherein the connection of the auxiliary passage to one of the piston comprises an aperture (47, 24, 87) embodied as a constant.

13. The shock absorber according to claim 12, wherein the aperture (47, 87) substantially influences the damping characteristic.

14. The shock absorber according to claim 1, wherein the main valve (18, 48, 85) comprises a spring against which a sleeve (15) is pressed at a variable force, in which the pressure on the sleeve is produced by an auxiliary valve (16) embodied as a spring, the auxiliary valve (16) delimiting a chamber into which the auxiliary passage opens.

15. A shock absorber (1, 31) comprising:
   a cylinder (2, 32, 102);
   a piston (3, 33, 103, 133) displaceable within the cylinder, the piston including
      a main passage for a main flow,
      a pressure-loaded main valve (18, 48, 85) arranged in the main passage,
      an auxiliary passage for an auxiliary flow between opposite sides of the piston, the auxiliary passage extending between the opposite sides of the piston,
      a non-return valve (22) arranged in the auxiliary passage,
      an auxiliary plate-shaped valve (16, 46) delimiting a chamber (28, 58) into which the auxiliary passage opens, and
      a displaceable pressure element (15, 45) arranged between the plate-shaped valve and the main valve,
      wherein pressure on the main valve is applied by the pressure element (15, 45) which is acted on by the plate-shaped valve (16, 46),
      wherein the auxiliary flow through the auxiliary passage into the chamber acts in the chamber under the plate-shaped valve in order to reduce the force transmitted thereby onto the displaceable pressure element and
      wherein a maximum pressure force is applied by the pressure element on the main valve when the auxiliary flow through the auxiliary passage is absent.

16. The shock absorber according to claim 15, wherein an adjustable throttling member (6, 36, 106, 136) is provided in the auxiliary passage for the auxiliary flow,
   wherein the throttling member comprises a displaceable slide accommodated in a sleeve, wherein the sleeve and the slide are provided with apertures which can be arranged opposite one another and through which extend conduits for the auxiliary flow.

17. The shock absorber according to claim 16, wherein the piston is displaceable in the cylinder via an inward and outward movement of the piston in the cylinder, and wherein the sleeve comprises an inlet (116) which is common to both the inward and outward stroke and wherein the part of the sleeve corresponding to the inlet opens out on both sides of the sealing of the piston cylinder.

18. The shock absorber according to claim 16, wherein the piston is displaceable in the cylinder via an inward and outward movement of the piston in the cylinder, and wherein the adjustable throttling member (6, 36, 106, 136) dampens the inward stroke more and the outward stroke less.

19. The shock absorber according to claim 16, wherein the piston is displaceable in the cylinder via an inward and outward movement of the piston in the cylinder, and wherein the adjustable throttling member (6, 36, 106, 136) dampens the inward stroke less and the outward stroke more.

20. A shock absorber (1, 31) comprising:
   a cylinder (2, 32, 102);
   a piston (3, 33, 103, 133) displaceable within the cylinder, the piston including
      a main passage for a main flow,
      a pressure-loaded main valve (18, 48, 85) arranged in the main passage,
      wherein pressure on the main valve is applied by a displaceable pressure element (15, 45) acted on by a spring plate (16, 46), and
      an auxiliary passage for an auxiliary flow between opposite sides of the piston, the auxiliary passage extending between the opposite sides of the piston, and
      a non-return valve (22) arranged in the auxiliary passage,
      an adjustable throttling member (6, 36, 106, 136) provided in the auxiliary passage for the auxiliary flow,
      wherein the auxiliary flow through the auxiliary passage acts under the spring plate in order to reduce the force transmitted thereby onto the displaceable pressure element,
      wherein a maximum pressure force is applied by the pressure element on the main valve when the auxiliary flow through the auxiliary passage is absent.

* * * * *